(No Model.)
I. A. SMITH.
CULTIVATOR.
No. 294,091.	Patented Feb. 26, 1884.
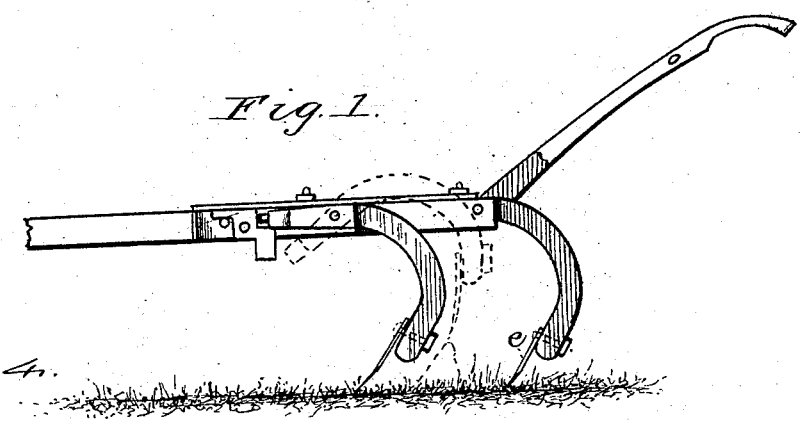
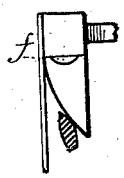
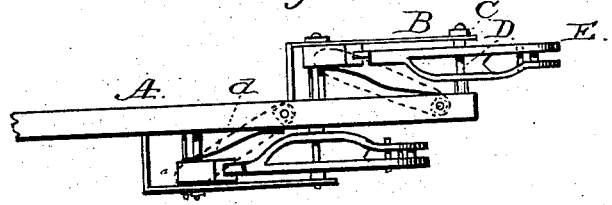
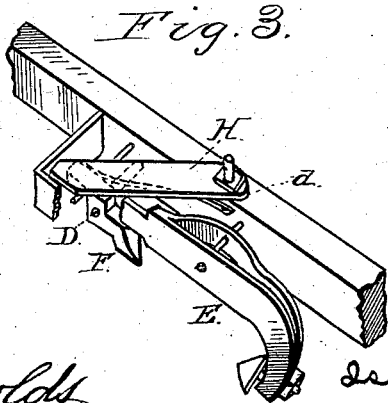
Attest
J. W. Reynolds
David H. Mead
Inventor
Isaac A. Smith
By O. E. Duff
atty.

UNITED STATES PATENT OFFICE.

ISAAC A. SMITH, OF DEXTER CITY, MISSOURI.

CULTIVATOR.

SPECIFICATION forming part of Letters Patent No. 294,091, dated February 26, 1884.

Application filed August 16, 1883. (No model.)

*To all whom it may concern:*

Be it known that I, ISAAC A. SMITH, of Dexter City, in the county of Stoddard and State of Missouri, have invented certain new and useful Improvements in Plows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in cultivators and plows, designed to adjustably secure the standards to the frame in such a manner that when the teeth or share come in contact with a large stone, root, or the like, the upper part of the standard is automatically disengaged from the beam, thus allowing the teeth to swing out of the ground.

The object of my invention is to obviate this difficulty; and to that end it consists of an attachment for connecting the standard of a cultivator or plow to the beam, whereby the teeth or share are automatically thrown out of the ground when a stone or the like is struck, and are returned to their normal position by lifting on the handle sufficiently to enable the share or teeth to clear the ground and swing back into place.

I will now proceed to describe my invention as applied to a cultivator, in connection with the accompanying drawings, in which—

Figure 1 is a side elevation. Fig. 2 is a plan view. Fig. 3 is a perspective view with the casing broken away, and Fig. 4 is a detail view of the spring-actuated catch which holds the end of the standard.

In these drawings, A represents the beam, to which is attached the casing B. This casing is right-angular in shape. One, and the shorter, arm of this bears on the side of the beam, and the other, longer, arm extends along the side to a point, C, where it is secured by means of a bolt, D, which extends through the casing and standard, and takes into the beam a suitable distance. This bolt forms the pivot on which the standard turns in changing its positions.

The standard E is preferably made of the form shown—that is, with a slot extending nearly its whole length, in which is adapted to slide the shank of the tooth $e$, which is held in place by a nut screwed onto the end of the shank. This construction renders easy an adjustment up or down of the tooth, as may be desired. To hold the upper end of the standard, I have provided the catch F, held in place inside the casing by the pin G. On the top of the lower end of this catch rests the end of the pivoted standard E. To hold this catch against any ordinary pressure, I have provided the flat spring H, which is secured at one end to the beam by a bolt passing up through the beam, and having a nut on its upper end, which is screwed down onto the spring to hold it firmly in place. The free end of this spring bears upon the flat upper edge of the catch F, and counterbalances the upward pressure of the standard. The catch is held against the casing by means of a small side spring, $d$, which is fastened to the side of the beam in any suitable way. The inside of the standard and the outside of the rear downwardly-extending end of the catch are beveled, so that when the standard is disengaged, and it is desired to engage it, it is only necessary to exert a downward pressure on the lower end of the standard, and it will push against beveled side of the catch and overcome the side spring. This permits the standard to pass the catch, when the latter will be pushed back by the action of the spring bringing the notch $f$ (shown in Fig. 4) directly under the end of the standard, into which the latter fits. The opening in the catch F, through which the pivot passes, is large enough to allow it to slide laterally without difficulty when pressure is applied.

From the construction described it will be evident that when the teeth come in contact with an obstruction, and hence an extraordinary strain exerted, the flat spring H will be overcome, releasing the standard carrying the teeth, which will swing back, bringing the teeth out of the ground; and in order to again connect the standard with the beam it is only necessary to lift the cultivator up from the ground, and the lower part of the standards, by reason of their greater weight, will swing forward. This forward motion brings the upper beveled portion of the standard against the correspondingly-beveled catch, and the the catch is forced laterally a short distance against the spring $d$, allowing the standard to pass, after which the catch is pushed back by the spring, and the standard held against any ordinary strain.

I am aware that standards of cultivators have been secured to the beams of the same in such a way as to be automatically released when unusual strain is brought upon them, and I do not broadly claim such device.

What I do claim is—

1. The catch or cam F, of the form shown and described, centrally pivoted, and having the shoulder *f* and beveled or knife edge C.

2. The combination, with a cultivator-beam and a pivoted standard, of the rotating catch F, of the form shown and described, and the spring H.

3. The combination, with a cultivator-beam and pivoted standard, of the catch F, of the the form shown and described, spring H, and side spring, *d*, substantially as described.

In testimony that I claim the foregoing as my own I affix my signature in presence of two witnesses.

ISAAC A. SMITH.

Witnesses:
W. O. KELLEY,
C. E. STOKES.